(12) United States Patent
Wright et al.

(10) Patent No.: US 9,038,678 B2
(45) Date of Patent: May 26, 2015

(54) REDUCTANT FILL SYSTEM

(75) Inventors: Cameron J. Wright, Peoria, IL (US); Christopher M. Gruel, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 771 days.

(21) Appl. No.: 13/356,780

(22) Filed: Jan. 24, 2012

(65) Prior Publication Data

US 2013/0186509 A1 Jul. 25, 2013

(51) Int. Cl.
*B65B 1/30* (2006.01)
*F01N 3/20* (2006.01)

(52) U.S. Cl.
CPC ....... *F01N 3/2066* (2013.01); *F01N 2610/1413* (2013.01); *F01N 2610/148* (2013.01); *F01N 2610/142* (2013.01); *Y02T 10/24* (2013.01)

(58) Field of Classification Search
CPC .................. F01N 2610/142; F01N 2610/1413; Y02T 10/24
USPC .......................... 137/454; 141/95, 198; 60/299
See application file for complete search history.

(56) References Cited

U.S. PATENT DOCUMENTS

| | | | | |
|---|---|---|---|---|
| 5,465,766 | A * | 11/1995 | Siegele et al. .................. | 141/198 |
| 6,293,097 | B1 * | 9/2001 | Wu et al. .......................... | 60/286 |
| 2008/0298788 | A1 | 12/2008 | Martucci | |
| 2011/0047966 | A1 | 3/2011 | Zhang | |
| 2011/0179776 | A1 * | 7/2011 | Magnusson et al. ............ | 60/295 |
| 2011/0209465 | A1 | 9/2011 | Novellani | |
| 2013/0125997 | A1 * | 5/2013 | Lawrence et al. ................. | 137/2 |
| 2014/0366512 | A1 * | 12/2014 | Hodgson et al. ................. | 60/286 |

* cited by examiner

*Primary Examiner* — Jason K Niesz

(57) ABSTRACT

A reductant fill system is provided. A reductant tank is configured to store a reductant. A receiver is configured to receive a supply of the reductant from an off-board reservoir. A first valve is in communication with the reductant tank and is configured to control a reductant flow into the reductant tank. A reductant supply line is in fluid communication with the receiver. The reductant supply line is configured to provide the reductant flow to the first valve. The reductant level sensor is configured to generate a signal based on a level of reductant in the reductant tank. A controller is communicably coupled to the reductant level sensor. The controller is configured to purge a stranded reductant in the reductant supply line, based on the signal generated by the reductant level sensor.

20 Claims, 4 Drawing Sheets

REDUCTANT FILL SYSTEM

TECHNICAL FIELD

The present disclosure is relates to a reductant fill system, and more particularly to a refill and purging system for the reductant fill system.

BACKGROUND

A level of a reductant stored in a reductant tank decreases as the reductant is used, thereby requiring the reductant tank to be refilled. U.S. Published Application No. 2011/0209465 relates to a liquid additive reservoir including a rigid casing delimiting a housing, and a fluid-tight flexible pouch mounted inside the housing of the casing and intended to contain the liquid additive, the flexible pouch being designed to be connected to the exhaust line of an internal combustion engine of a vehicle.

SUMMARY OF THE DISCLOSURE

In one aspect, the present disclosure provides a reductant fill system. The reductant fill system includes a reductant tank, a receiver, a first valve, a reductant supply line, a reductant level sensor, and a controller. The reductant tank is configured to store a reductant. The receiver is configured to receive a supply of the reductant from an off-board reservoir. The first valve is in communication with the reductant tank and is configured to control a reductant flow into the reductant tank. The reductant supply line is in fluid communication with the receiver. The reductant supply line is configured to provide the reductant flow to the first valve. The reductant level sensor is configured to generate a signal based on a level of reductant in the reductant tank. The controller is communicably coupled to the reductant level sensor. The controller is configured to purge a stranded reductant in the reductant supply line, based on the signal generated by the reductant level sensor.

In another aspect, the disclosure provides a method for filling a reductant tank. The method supplies a reductant from a receiver through a pump fluidly connected to an off-board reservoir. The receiver is connected to a first valve in the reductant tank through a reductant supply line. The method generates a signal, by a reductant level sensor, indicative of a level of the reductant in the reductant tank. The method issues a command, by a controller, to purge a stranded reductant in the reductant supply line, based on the signal generated by the reductant level sensor.

Other features and aspects of this disclosure will be apparent from the following description and the accompanying drawings.

DETAILED DESCRIPTION

Figure 1:
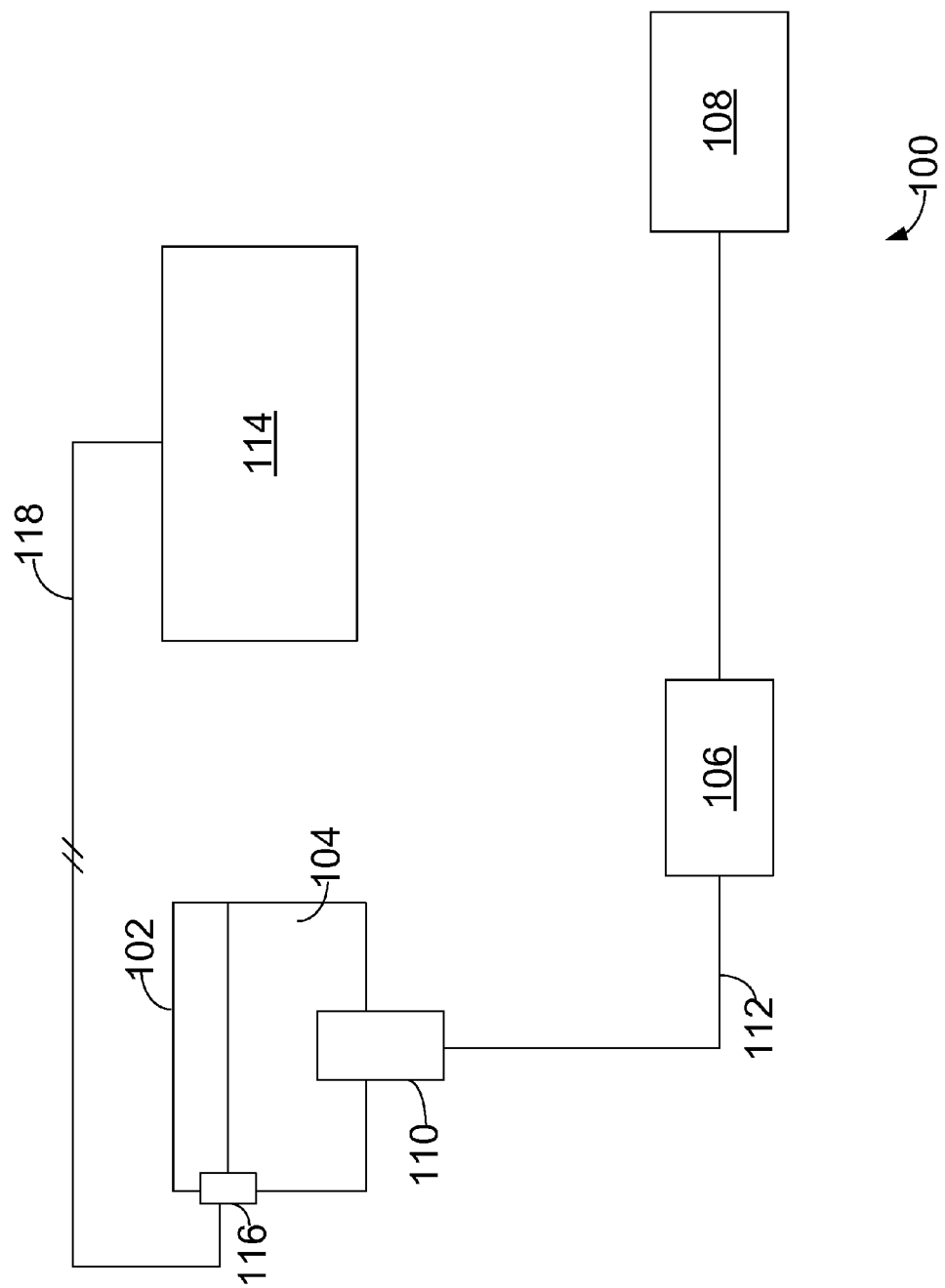
FIG. 1 is a diagrammatic view of an exemplary reductant fill system, according to one embodiment of the present disclosure.

FIG. 1 illustrates an exemplary reductant fill system 100. The reductant fill system 100 may include a reductant tank 102. The reductant tank 102 stores a reductant 104. In one embodiment, the reductant 104 may include, without any limitation, diesel exhaust fluid (DEF), ammonia or any other reducing agent.

The reductant tank 102 may be located in an engine compartment of a machine and the reductant tank 102 may either be a part of or connected to an aftertreatment system used in the machine. The machine may include for example, on-highway trucks or vehicles, track type tractors, off-highway trucks or machines, earth moving equipment, generators, aerospace applications, locomotive applications, marine applications, pumps, stationary equipment, or other engine powered applications.

In one embodiment, the reductant tank 102 may be provided in proximity to a fuel tank (not shown in figure) in the engine compartment. A person of ordinary skill in the art will appreciate that the reductant tank 102 may be located anywhere in the machine. Parameters such as size, shape, material, and location of the reductant tank 102 may vary. Moreover, the reductant tank 102 may need to be refilled from time to time.

As shown in FIG. 1, a receiver 106 is configured to receive a supply of the reductant 104 from an off-board reservoir 108. The reservoir 108 or any other storage located at the off-board may be temporarily connected to the receiver 106 in order to supply the reductant 104 to the reducant fill system 100. In another embodiment, the receiver 106 may be located proximal to the off-board, facilitating in ease of access.

A first valve 110 is in communication with reductant tank 102. The first valve 110 may be configured to receive a reductant flow into the reductant tank 102. The first valve 110 may automatically close when the reductant tank 102 is full. The receiver 106 may be in fluid communication with the first valve 110 via a reductant supply line 112. The reductant supply line 112 may provide the reductant flow to the first valve 110. Moreover, the reductant supply line 112 may be hose or pipe made of any suitable material, such as plastic, rubber, and the like. Parameters such as length, diameter and flexibility of the reductant supply line 112 may vary. In one embodiment, a part or entire of the reductant supply line 112 may be located outside of the machine.

In one embodiment, a portion of the reductant flow may be stranded in the reductant supply line 112. As shown in FIG. 1, the reductant fill system 100 may include a controller 114 communicably coupled to a reductant level sensor 116 via a communication line 118. The reductant level sensor 116 may generate a signal based on a level of the reductant 104 in the reductant tank 102. In one embodiment, the reductant level sensor 116 may generate the signal if the level of the reductant 104 in the reductant tank 102 is above a pre-determined threshold. The controller 114 may be configured to purge the stranded reductant in the reductant supply line 112, based on the signal generated by the reductant level sensor 116.

Figure 2:
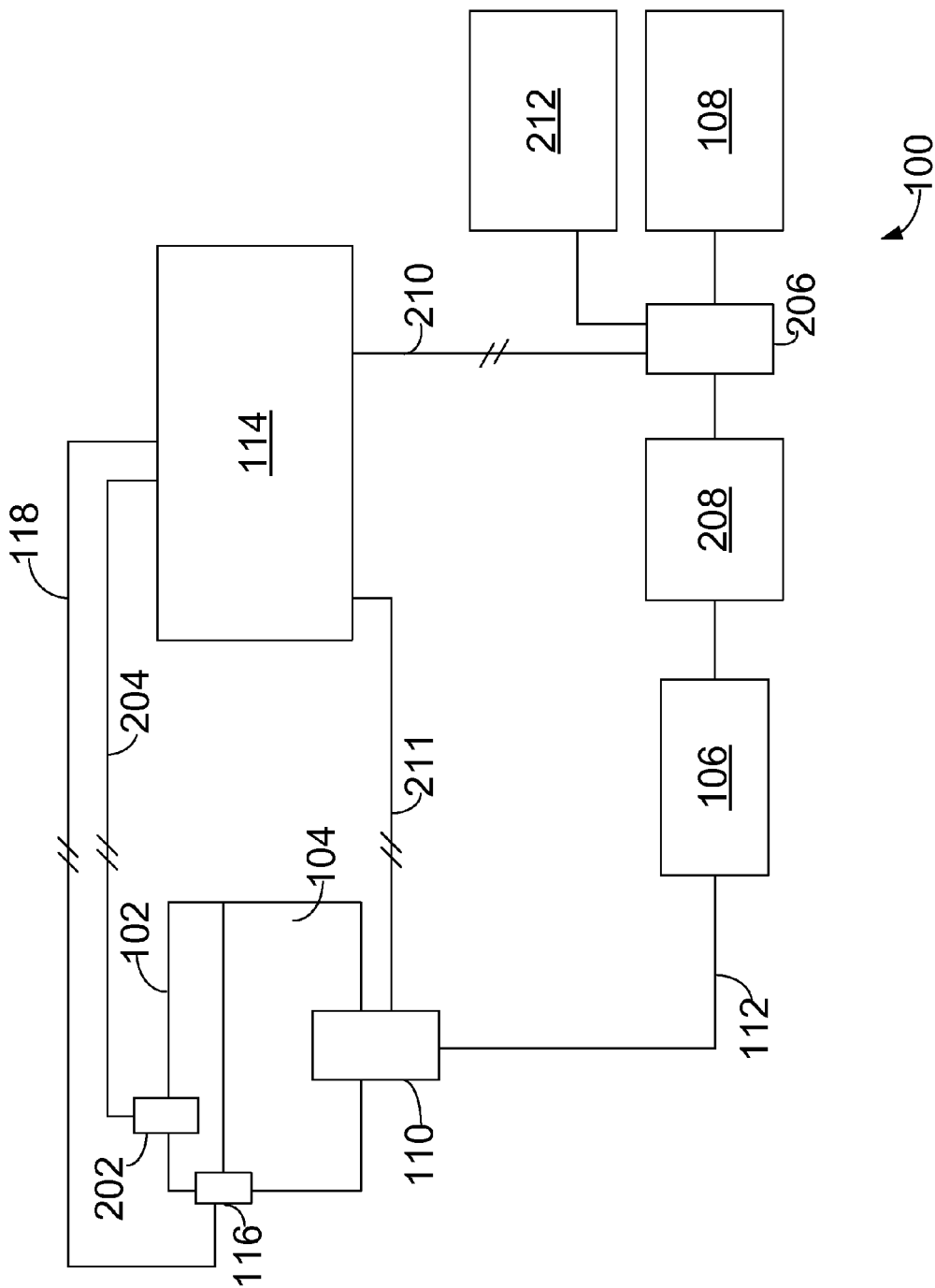
FIG. 2 is a diagrammatic view of an exemplary push to tank arrangement of the reductant fill system.

As shown in FIG. 2, in an exemplary push to tank arrangement of the reductant fill system 100, the reductant fill system 100 may include a vent 202 in the reductant tank 102. In one embodiment, the vent 202 may be located at the top of the reductant tank 102. Moreover, the vent 202 may be communicatively coupled to the controller 114 via a communication line 204. The controller 114 may be configured to control an opening of the vent 202. A person of ordinary skill in the art will appreciate that the vent 202 may shut off automatically after the reductant tank 102 is filled.

A second valve 206 may be located between a pump 208 and the reservoir 108. The second valve 206 may be located off-board. The controller 114 may be communicatively coupled to the first and second valves 110, 206 via communication lines 210, 211. The second valve 206 may provide a supply of one of the reductant 104 or pressurized air from a pressurized air source 212 to the pump 208, based on a command from the controller 114. Accordingly, the pump 208 may supply one of a flow of the reductant 104 or the pressurized air to the receiver 106. In one embodiment, the pump 208 may be a reversible variable displacement pump. In another embodiment, the pump 208 may be a fixed displacement pump with variable input. A person of ordinary skill in the art will appreciate that variations of the pump 208 include a pump that may or may not be reversible. Also, in some cases, the pump 208 may or may not be a variable displacement pump.

Figure 3:
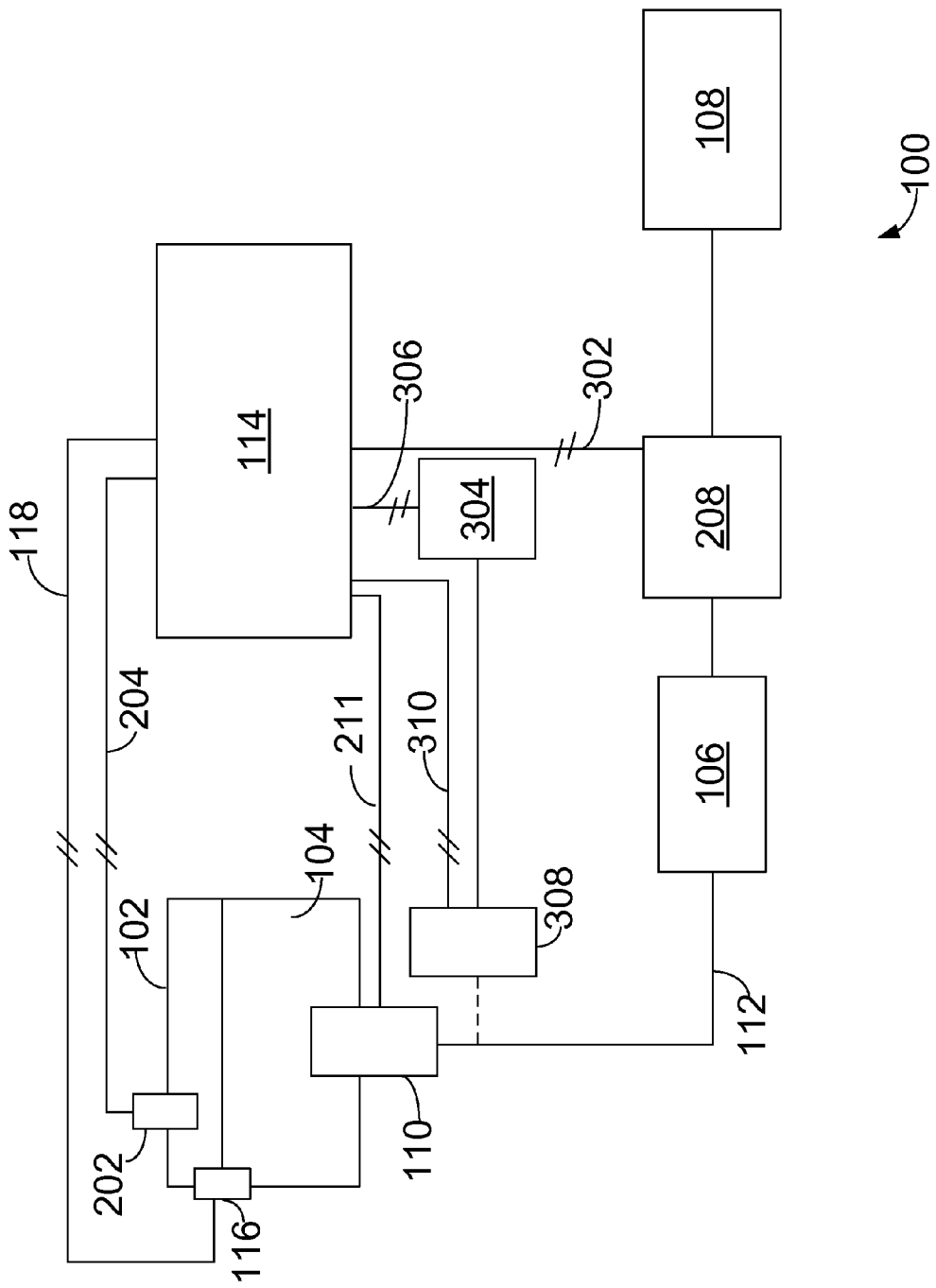
FIG. 3 is a diagrammatic view of an exemplary pull back to fill arrangement of the reductant fill system.

FIG. 3 illustrates an exemplary pull back to fill arrangement of the reductant supply system 100. In this arrangement, the pump 208 is a reversible displacement pump. Moreover, as shown in FIG. 3, the pump 208 is communicatively coupled to the controller 114 via a communication line 302. The pump 208 is configured to reverse a direction of flow based on a command from the controller 114.

Additionally, the controller 114 may be communicatively coupled to an air supply 304 via a communication line 306. The air supply 304 may be located on-board or off-board. In one embodiment, as shown in FIG. 3, a third valve 308 may be communicatively coupled to the controller 114 via a communication line 310, such that on receiving a command from the controller 114, the third valve 308 may introduce the air supply 304 in the reductant supply line 112.

A person of ordinary skill in the art will appreciate that the push to tank and the pull back to fill arrangements described above are merely on an exemplary basis and do not limit the scope of the disclosure. The reductant fill system 100 may include other components not described herein, that may facilitate in the filling of the reductant 104 in the reductant tank 102 and the purging of the stranded reductant in the reductant supply line 112.

In one embodiment, the controller 114 may be a microcomputer including a microprocessor unit, input and output ports, an electronic storage medium for executable programs and calibration values, random access memory, a data bus, and the like. The controller 114 may also include a routine for controlling and/or diagnosing one or more components of the system 100. Additionally, in another embodiment, the controller 114 may be located at a remote location. In yet another embodiment, the controller 114 may be located within the engine compartment of the machine.

Figure 4:
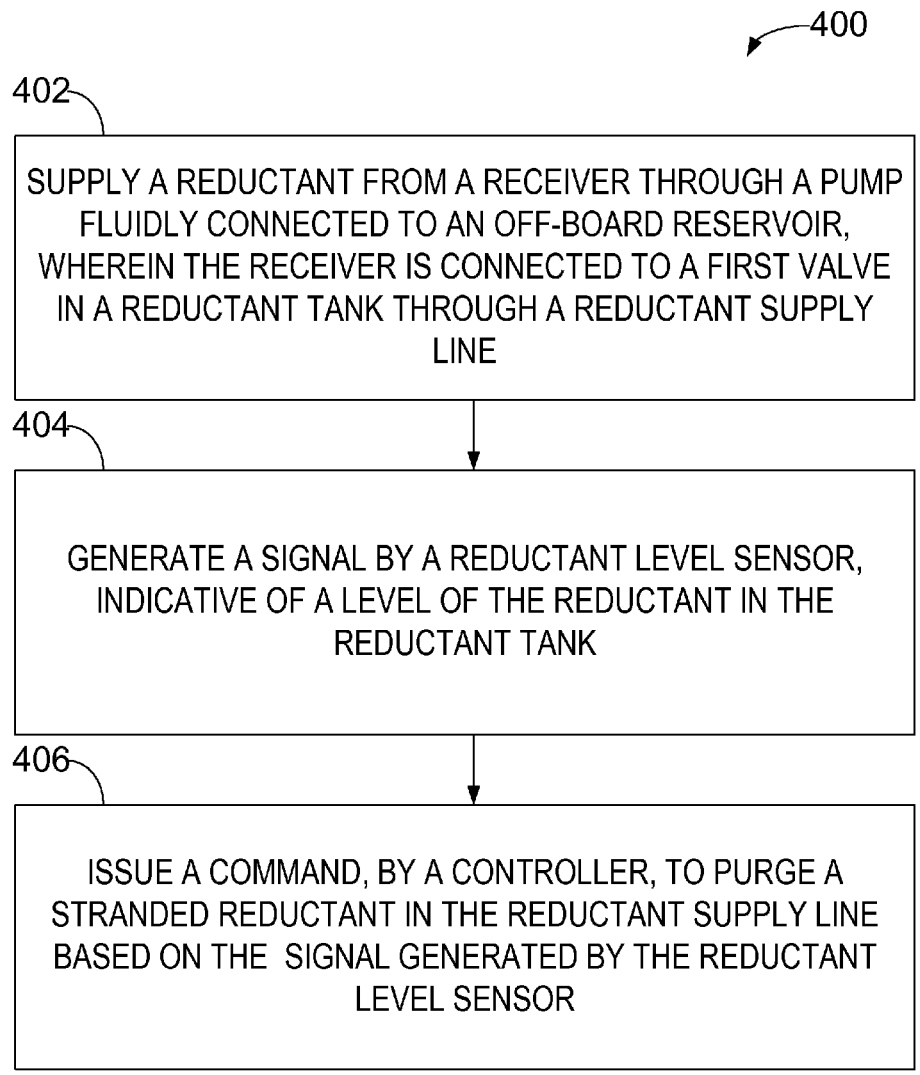
FIG. 4 is a process for filling of a reductant tank.

The refill of the reductant tank 102 and operation of the controller 114 to purge the stranded reductant in the reductant supply line 112 will be explained in detail with connection to FIG. 4.

INDUSTRIAL APPLICABILITY

Generally, at the time of a refill operation, an operator may position the machine relative to an off-board reservoir 108, or a service machine having a refill tank. Typically, the reductant tank 102 may then be refilled by splash fill method wherein a fill pipe which dispenses the reductant 104 is lowered into a part of the reductant tank 102 during refilling. In certain machines the reductant tank 102 may be located high on the machine relative to a refill connector or port. This type of refilling of the reductant tank 102 may require the operator to climb up onto the machine in order to refill the reductant tank 102. The above described disclosure relates to filling of the reductant tank 102 from the off-board location. The ground level filling may provide a fast and safe solution for the filling of the reductant tank 102.

At step 402, the reductant 104 is supplied from the receiver 106 through the pump 208. The receiver 106 may be positioned at ground level for ease of service by personnel and/or connection to the off-board reservoir 108. As shown in FIGS. 2 and 3, the pump 208 is fluidly connected to the reservoir 108. Moreover, the receiver 106 is connected to the first valve 110 in the reductant tank 102 via the reductant supply line 112. The pump 208 may supply the flow of the reductant 104 to the receiver 106. In an exemplary setup, an external nozzle of the pump 208 connected to the reservoir 108, is plugged into the receiver 106 to provide the flow of the reductant 104.

The first valve 110 may allow the reductant flow from the receiver 106 to enter the reductant tank 102. In one embodiment, the first valve 110 may automatically close and/or the vent 202 may automatically shut-off, when the reductant tank 102 is full. In another embodiment, the vent 202 and the first valve 110 may be packaged together and installed as a unitary component. In case engine water needs to be run to thaw the vent 202 and the first valve 110, the use of a single component provides ease of use.

The disclosure described herein facilitates refilling the reductant tank 102 from the off-board location. This protects the user of the reductant fill system 100 from injury caused in case the user would have to climb onto the machine to refill the reductant tank 102. Moreover, current projections show that on an average the reductant tank 102 may require refilling at least once per shift or once per day. Hence, the disclosed reductant fill system 100 would have a usability of a minimum of once per day.

Additionally, the receiver 106 and the reductant tank 102 may be located very far away from each other. A portion of the reductant 104 may be stranded in the reductant supply line 112 which may freeze and also block the reductant supply line 112. The blocked reductant may cause efficiency problems, service problems, component life problems, and machine downtime. The disclosure relates to clearing the stranded reductant present in the reductant supply line 112 connecting the receiver 106 and the reductant tank 102, thereby preventing the blockage of the reductant supply line 112.

In some situations, a portion of the reductant 104 may be stranded in the reductant supply line 112. The stranded reductant in the reductant supply line 112 may need to be purged from the reductant fill system 100 after the reductant tank 102 is filled. FIGS. 2 and 3 describe two exemplary arrangements, the push to tank and the pull back to fill arrangements, for purging the stranded reductant in the reductant supply line 112.

At step 404, the signal is generated by the reductant level sensor 116. The signal may be indicative of the level of the reductant 104 in the reductant tank 102. In one embodiment, the signal may be generated if the level of the reductant 104 in the reductant tank 102 is above a pre-determined threshold.

Subsequently, at step 406, a command is issued by the controller 114 to purge the stranded reductant in the reductant supply line 112, based on the signal generated by the reductant level sensor 116.

In the push to tank arrangement shown in FIG. 2, the controller 114 may issue a command to open the vent 202 associated with the reductant tank 102 via communication line 204. Then, the controller 114 may issue a command to the second valve 206 which is coupled with the pump 208, to switch the supply of the reductant 104 with the supply of the pressurized air from the pressurized air source 212 in the reductant supply line 212.

The pressurized air may flow through the receiver 106 and push the stranded reductant up the reductant supply line 112 towards the first valve 110 of the reductant tank 102. The controller 114 may issue a command to the first valve 110 to open. The pressurized airflow along with the stranded reductant may enter into the reductant tank 102. Hence, the stranded reductant in the reductant supply line 112 may be purged by pushing the stranded reductant into the reductant tank 102 in the push to tank arrangement. In one embodiment, the vent 202 may close after a pre-determined time duration. A person of ordinary skill in the art will appreciate that the pump 208 may be prevented from release until the refill and the purging cycle is complete, either externally or by the controller 114.

In the pull back to fill arrangement shown in FIG. 3, the controller 114 may issue a command to introduce the air supply 304 in the reductant supply line 112. Subsequently, the controller 114 may issue a command to reverse the direction of the pump 208, to pull the stranded reductant in the reductant supply line 112 to the reservoir 108. In one embodiment, the air supply 304 may be introduced in the reductant supply line 112 via the third valve 308. A person of ordinary skill in the art will appreciate that the introduction of the air supply may be done by any other suitable remote method, without any limitation. The introduction of the air supply 304 is to prevent a vacuum from being created in the reductant supply line 112 due to the pull generated by reversing the direction of the pump 208. During the purging cycle, the connection between the pump 208 and the receiver 106 may be maintained either externally or by the controller 114. Hence, in this arrangement, the stranded reductant in the reductant supply line 112 is pulled back into the reservoir 108.

In one embodiment, the purging of the stranded reductant in the reductant supply line 112 may be have a time based control and may cease after a pre-determined interval of time. Moreover, in another embodiment, the controller 114 may be triggered manually to purge the stranded reductant in the reductant supply line 112, using an appropriate user interface.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A reductant fill system comprising:
a reductant tank configured to store a reductant;
a receiver configured to receive a supply of the reductant from an off-board reservoir;
a first valve in communication with the reductant tank configured to control a reductant flow into the reductant tank;
a reductant supply line in fluid communication with the receiver, the reductant supply line configured to provide the reductant flow to the first valve;
a reductant level sensor configured to generate a signal based on a level of the reductant in the reductant tank; and
a controller communicably coupled to the reductant level sensor, the controller configured to purge a stranded reductant in the reductant supply line, based on the signal generated by the reductant level sensor.

2. The reductant fill system of claim 1, wherein the reductant includes a diesel emission fuel.

3. The reductant fill system of claim 1, further including a vent in the reductant tank.

4. The reductant fill system of claim 3, wherein the controller is communicably coupled to the vent, the controller being configured to control an opening of the vent.

5. The reductant fill system of claim 1 further including a pump configured to supply one of a flow of the reductant or pressurized air to the receiver.

6. The reductant fill system of claim 5 further including a second valve configured to provide a supply of one of the reductant or the pressurized air to the pump, based on a command from the controller.

7. The reductant fill system of claim 5, wherein the pump is a reversible variable displacement pump.

8. The reductant fill system of claim 7, wherein the pump is configured to reverse a direction of flow based on a command from the controller.

9. The reductant fill system of claim 1, wherein the controller is further configured to introduce air in the reductant supply line.

10. The reductant fill system of claim 1, wherein the signal is generated by the reductant level sensor if the level of the reductant in the reductant tank is above a pre-determined threshold.

11. A method for filling a reductant tank, the method comprising:
supplying a reductant to a receiver via a pump fluidly connected to an off-board reservoir, wherein the receiver is connected to a first valve in the reductant tank through a reductant supply line;
generating a signal, by a reductant level sensor, indicative of a level of the reductant in the reductant tank; and
issuing a command, by a controller, to purge a stranded reductant in the reductant supply line, based on the signal generated by the reductant level sensor.

12. The method of claim 11, wherein issuing a command includes:
issuing a command to open a vent associated with the reductant tank;
issuing a command to a second valve, coupled with the pump, to switch the supply of the reductant with a supply of pressurized air in the reductant supply line; and
issuing a command to a first valve to purge the stranded reductant in the reductant supply line into the reductant tank.

13. The method of claim 12 further including closing the vent after a pre-determined time duration.

14. The method of claim 11, wherein issuing a command includes:
issuing a command to introduce an air supply in the reductant supply line; and
issuing a command to reverse a direction of the pump to pull the stranded reductant in the reductant supply line to the off-board reservoir.

15. The method of claim 11, wherein the signal is generated by the reductant level sensor if the level of the reductant in the reductant tank is above a pre-determined threshold.

16. A computer based system for filling a reductant tank comprising:
a communication interface communicating with a memory;
the memory configured to communicate with a processor; and
the processor, in response to executing a computer program, performs operations comprising:
supplying a reductant from a receiver through a pump fluidly connected to an off-board reservoir, wherein the receiver is connected to a first valve in the reductant tank through a reductant supply line;

generating a signal, by a reductant level sensor, indicative of a level of the reductant in the reductant tank; and issuing a command to purge a stranded reductant in the reductant supply line, based on the signal generated by the reductant level sensor.

17. The computer based system of claim 16, wherein the processor is further configured to perform the operations including:

issuing a command to open a vent associated with the reductant tank;

issuing a command to a second valve, coupled with the pump, to switch the supply of the reductant with a supply of pressurized air in the reductant supply line; and issuing a command to a first valve to purge the stranded reductant in the reductant supply line into the reductant tank.

18. The computer based system of claim 16, wherein the processor is further configured to perform the operations including closing the vent after a pre-determined time duration.

19. The computer based system of claim 16, wherein the processor is further configured to perform the operations including:

issuing a command to introduce an air supply in the reductant supply line; and issuing a command to reverse a direction of the pump to pull the stranded reductant in the reductant supply line to the off-board reservoir.

20. The computer based system of claim 16, wherein the processor is further configured to perform the operations including generating the signal by the reductant level sensor if the level of the reductant in the reductant tank is above a pre-determined threshold.

* * * * *